(12) United States Patent
King

(10) Patent No.: US 9,988,910 B2
(45) Date of Patent: Jun. 5, 2018

(54) STAGGERED CORE PRINTOUT

(71) Applicant: United Technologies Corporation, Hartford, CT (US)

(72) Inventor: Christopher King, Bristol, CT (US)

(73) Assignee: United Technologies Corporation, Farmington, CT (US)

( * ) Notice: Subject to any disclaimer, the term of this patent is extended or adjusted under 35 U.S.C. 154(b) by 583 days.

(21) Appl. No.: 14/609,677

(22) Filed: Jan. 30, 2015

(65) Prior Publication Data

US 2016/0222792 A1 Aug. 4, 2016

(51) Int. Cl.
| | |
|---|---|
| *F02C 1/00* | (2006.01) |
| *F01D 5/18* | (2006.01) |
| *B22C 9/10* | (2006.01) |
| *B23K 26/382* | (2014.01) |
| *B22D 25/02* | (2006.01) |
| *B23H 9/14* | (2006.01) |
| *F01D 5/14* | (2006.01) |
| *F01D 9/04* | (2006.01) |
| *F01D 11/08* | (2006.01) |
| *F01D 25/12* | (2006.01) |
| *F02C 7/18* | (2006.01) |
| *F23R 3/00* | (2006.01) |

(52) U.S. Cl.
CPC ............. *F01D 5/186* (2013.01); *B22C 9/10* (2013.01); *B22D 25/02* (2013.01); *B23H 9/14* (2013.01); *B23K 26/382* (2015.10); *F01D 5/147* (2013.01); *F01D 9/041* (2013.01); *F01D 11/08* (2013.01); *F01D 25/12* (2013.01); *F02C 7/18* (2013.01); *F23R 3/002* (2013.01); *F05D 2220/32* (2013.01); *F05D 2230/12* (2013.01); *F05D 2230/13* (2013.01); *F05D 2230/21* (2013.01); *F05D 2230/30* (2013.01); *F05D 2260/202* (2013.01); *Y02T 50/676* (2013.01)

(58) Field of Classification Search
USPC .......... 415/115, 116, 173.1; 416/97 R, 97 A, 416/90 R, 232; 60/751, 754, 755, 756, 60/760, 806
See application file for complete search history.

(56) References Cited

U.S. PATENT DOCUMENTS

| | | |
|---|---|---|
| 4,676,719 A | 6/1987 | Auxier et al. |
| 5,405,242 A | 4/1995 | Auxier et al. |
| (Continued) | | |

FOREIGN PATENT DOCUMENTS

| | | |
|---|---|---|
| EP | 1857199 A1 | 11/2007 |
| EP | 2000232 A1 | 12/2008 |

OTHER PUBLICATIONS

European Search Report for European Application No. 16153175.1 dated Jun. 6, 2016.

*Primary Examiner* — Binh Q Tran
(74) *Attorney, Agent, or Firm* — Carlson, Gaskey & Olds, P.C.

(57) ABSTRACT

A core for gas turbine engine component comprises a body extending between first and second ends to define a length, and extending between first and second edges to define a width. A plurality of core extensions are formed as part of the body. The plurality of core extensions are positioned to be staggered relative to each other such that at least two adjacent core extensions are variable relative to each other in at least one dimension. A gas turbine engine component is also disclosed.

16 Claims, 4 Drawing Sheets

(56) References Cited

U.S. PATENT DOCUMENTS

| | | |
|---|---|---|
| 6,913,064 B2 | 7/2005 | Beals et al. |
| 7,217,095 B2 | 5/2007 | Pietraszkiewicz et al. |
| 7,364,405 B2 | 4/2008 | Cunha et al. |
| 7,690,894 B1 | 4/2010 | Liang |
| 7,708,525 B2 | 5/2010 | Cherolis et al. |
| 7,717,676 B2 | 5/2010 | Cunha et al. |
| 8,777,571 B1 | 7/2014 | Liang |
| 2006/0104807 A1* | 5/2006 | Lee ................ F01D 5/186 415/115 |
| 2007/0044933 A1 | 3/2007 | Santeler |
| 2008/0181784 A1* | 7/2008 | Fokine ............ F01D 5/187 416/97 R |
| 2009/0068023 A1* | 3/2009 | Liang ............. F01D 5/186 416/97 R |
| 2009/0175733 A1 | 7/2009 | Poon et al. |
| 2010/0239409 A1* | 9/2010 | Draper ............ F01D 5/005 415/1 |
| 2013/0209269 A1* | 8/2013 | Gleiner .......... F01D 5/187 416/97 R |
| 2013/0280093 A1 | 10/2013 | Zelesky et al. |
| 2013/0323079 A1* | 12/2013 | Martin ........... F01D 5/186 416/97 R |
| 2014/0010666 A1 | 1/2014 | Hudson et al. |
| 2014/0356188 A1* | 12/2014 | Kollati .......... B23P 15/02 416/97 A |

\* cited by examiner

US 9,988,910 B2

STAGGERED CORE PRINTOUT

BACKGROUND OF THE INVENTION

In pursuit of higher engine efficiencies, higher turbine inlet temperatures have been relied upon to boost overall engine performance. This can result in gas path temperatures that may exceed melting points of turbine component constituent materials. To address this issue, dedicated cooling air is extracted from a compressor section and is used to cool the gas path components in the turbine, such as rotating blades and stator vanes for example, incurring significant cycle penalties.

One method of cooling turbine airfoils utilizes internal cooling channels or cavities formed in the airfoil to promote convective heat transfer. Cooling air is typically routed from a root of the airfoil toward a tip. The cooling air is then discharged out of the airfoil through a plurality of holes formed along a length of the airfoil. The cooling air exiting the holes forms a film of cooler air that shields the airfoil from incoming combustion gases.

Typically, these cooling holes and significant cooling mass flow rates are required to provide the needed amount of cooling. In order to effectively cool the airfoils to protect against damage, there is a need to balance the amount of cooling flow used and the overall heat transfer capability.

SUMMARY OF THE INVENTION

In a featured embodiment, a core for a gas turbine engine component comprises a body extending between first and second ends to define a length, and extending between first and second edges to define a width. A plurality of core extensions are formed as part of the body. The plurality of core extensions are positioned to be staggered relative to each other such that at least two adjacent core extensions are variable relative to each other in at least one dimension.

In another embodiment according to the previous embodiment, the body comprises a curvilinear structure.

In another embodiment according to any of the previous embodiments, the core extensions are spaced apart from each other.

In another embodiment according to any of the previous embodiments, a point along one of the first and second edges defines a radius of curvature. The core extensions are positioned on the radius of curvature.

In another embodiment according to any of the previous embodiments, the core extensions are spaced apart from each other long the radius of curvature.

In another embodiment according to any of the previous embodiments, at least one dimension comprises a length of the extrusion in a general radial direction, and wherein at least two of the core extensions have lengths that are different from each other.

In another embodiment according to any of the previous embodiments, the core extensions comprise polygonal or curved shaped core extensions.

In another embodiment according to any of the previous embodiments, the body defines an airfoil internal passage shape.

In another featured embodiment, a gas turbine engine component comprises a body extending between first and second ends to define a length and extending between first and second edges to define a width. A plurality of openings are formed within a wall surface of the body. The plurality of openings are positioned to be staggered relative to each other such that at least two adjacent openings are offset from each other in at least one direction.

In another embodiment according to any of the previous embodiments, a point along one of the first and second edges defines a radius of curvature. The openings are positioned on the radius of curvature and are spaced apart from each other.

In another embodiment according to any of the previous embodiments, the body comprises an airfoil with the first edge comprising a leading edge, the second edge comprising a trailing edge, the first end comprising a radially inner portion and the second end comprising a tip portion. The point is located at a position that is nearer to the leading edge than the trailing edge.

In another embodiment according to any of the previous embodiments, flow exiting the openings is generally parallel or angled relative to an associated streamline path.

In another embodiment according to any of the previous embodiments, the openings comprise polygonal or curved openings.

In another embodiment according to any of the previous embodiments, the openings are formed in a pressure and/or suction side of the airfoil.

In another embodiment according to any of the previous embodiments, the openings are formed in a platform for a vane, blade, or BOAS.

In another embodiment according to any of the previous embodiments, the openings are spaced apart from each other along an arcuate path extending between the first and second ends.

In another embodiment according to any of the previous embodiments, the openings comprise polygonal or curved openings.

In another embodiment according to any of the previous embodiments, the body comprises one of an airfoil, a blade, a vane, a BOAS, or a combustor panel.

In another embodiment according to any of the previous embodiments, the body comprises an airfoil with the first edge comprising a leading edge, the second edge comprising a trailing edge, the first end comprising a radially inner portion and the second end comprising a tip portion. The point is located at a position that is nearer to the trailing edge than the leading edge.

In another embodiment according to any of the previous embodiments, the body comprises an airfoil with the first edge comprising a leading edge, the second edge comprising a trailing edge, the first end comprising a radially inner portion and the second end comprising a tip portion, and wherein the point is located at a position that is nearer to the pressure side than the suction side.

In another embodiment according to any of the previous embodiments, the body comprises an airfoil with the first edge comprising a leading edge, the second edge comprising a trailing edge, the first end comprising a radially inner portion and the second end comprising a tip portion. The point is located at a position that is nearer to the suction side than the pressure side.

In another embodiment according to any of the previous embodiments, body comprises an airfoil with the first edge comprising a leading edge, the second edge comprising a trailing edge, the first end comprising a radially inner portion and the second end comprising a tip portion. The point is located at a position that nearer to the engine centreline than a radial outward location.

In another featured embodiment, a method of manufacturing a gas turbine engine component includes providing a body extending between first and second ends to define a length and extending between first and second edges to define a width. A plurality of openings is formed within a wall surface of the body. The plurality of openings are positioned to be staggered relative to each other such that at least two adjacent openings are offset from each other in at least one direction. Flow exiting the openings is generally parallel or angled relative to an associated streamline path, and forms the openings via one of a casting, EDM, laser, or additive manufacturing method.

The foregoing features and elements may be combined in any combination without exclusivity, unless expressly indicated otherwise.

These and other features may be best understood from the following drawings and specification.

DETAILED DESCRIPTION

Figure 1:
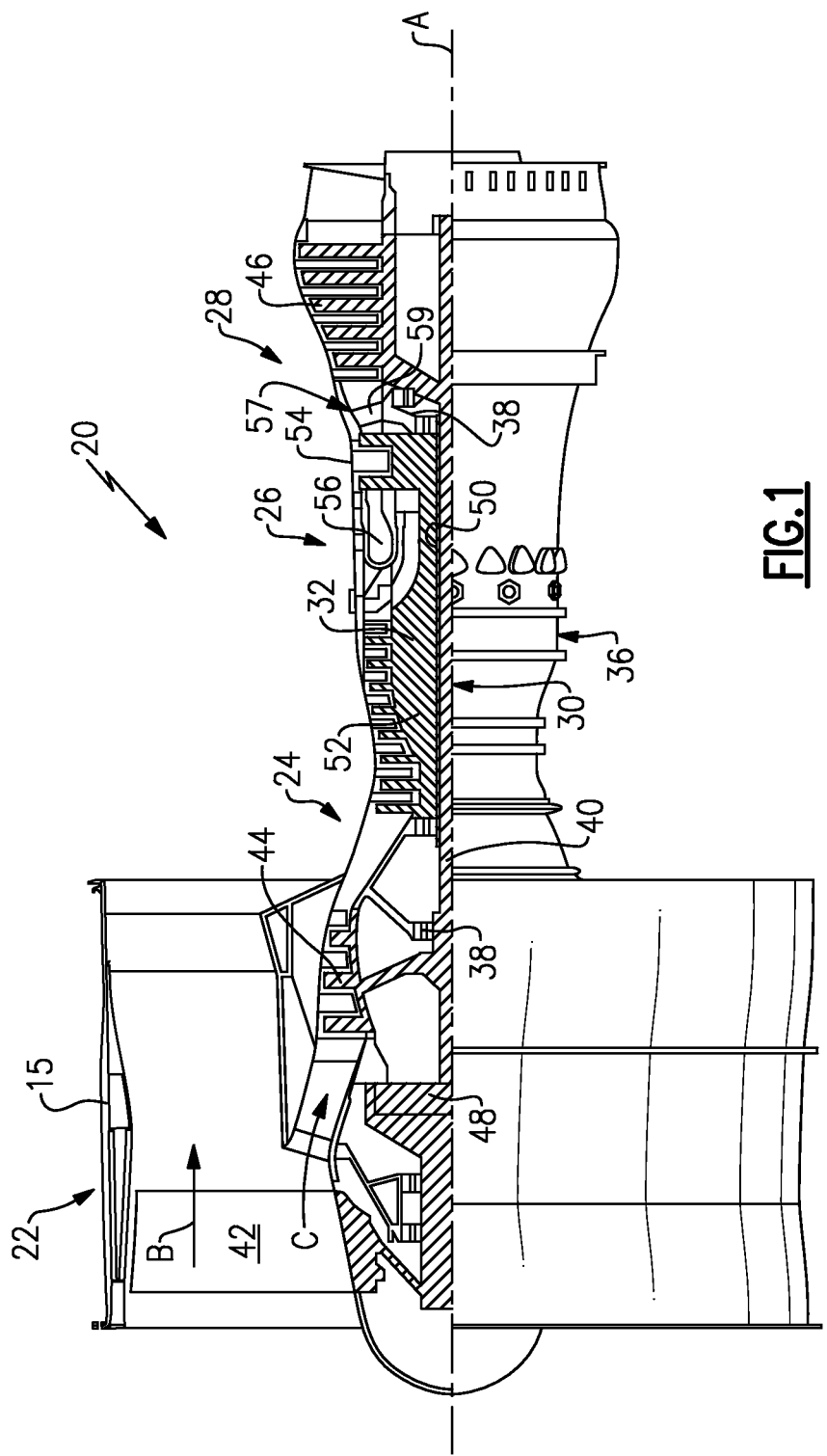
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
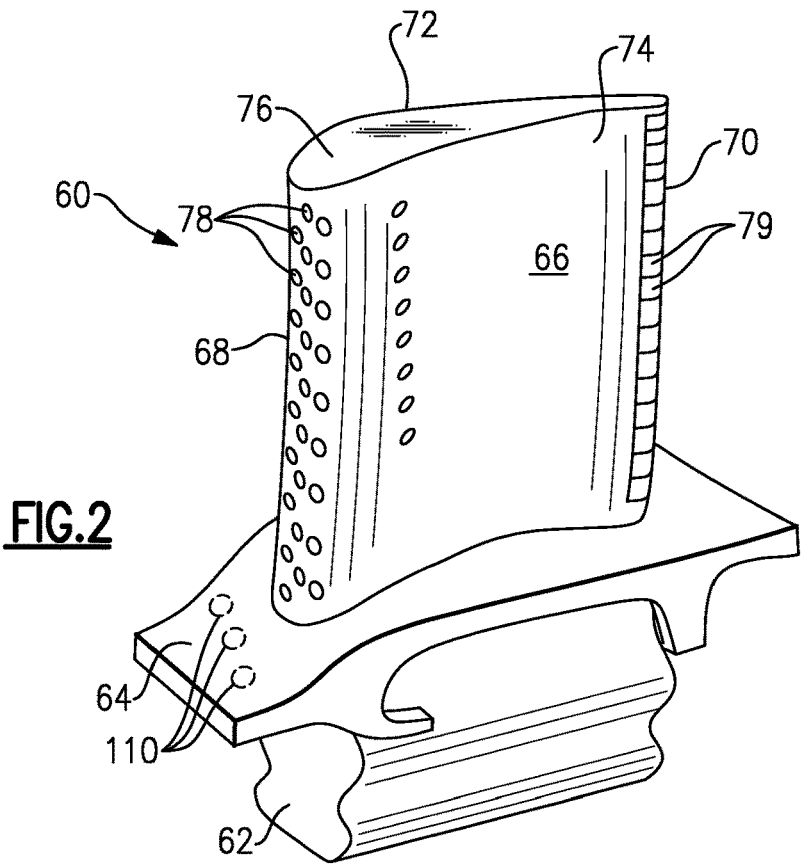
FIG. 2 is a side perspective view of a turbine blade.

Airfoils located downstream of combustor section 26, such as stator vanes and rotor blades in the turbine section 28 for example, operate in a high-temperature environment. Airfoils that are exposed to high temperatures typically include internal cooling channels that direct a flow of cooling air through the airfoil to remove heat and prolong the useful life of the airfoil. FIG. 2 is a side view of a turbine rotor blade 60 having a root section 62, a platform 64, and an airfoil section 66. Root section 62 is connected to a rotor in the turbine section 28 (FIG. 1) as known. The airfoil section 66 includes a leading edge 68, a trailing edge 70, a suction side wall 72, and a pressure side wall 74. The airfoil section 66 extends to a tip 76, and includes a plurality of surface cooling holes, such as film cooling holes 78, and a plurality of trailing edge cooling slots 79.

The platform 64 connects one end of airfoil section 66 to root section 62. The leading edge 68, trailing edge 70, suction side wall 72, and pressure side wall 74 extend outwardly away from the platform 64. The tip 76 closes off an opposite end of the airfoil section 66 from the platform 64. Suction side wall 72 and pressure side wall 74 connect leading edge 68 and trailing edge 70. Film cooling holes 78 are arranged over a surface of airfoil section 66 to provide a layer of cool air proximate the surface of airfoil section 66 for protection from high-temperature combustion gases. Trailing edge cooling slots 79 are arranged along trailing edge 70 to provide an exit for air circulating within airfoil section 66.

Figure 3:
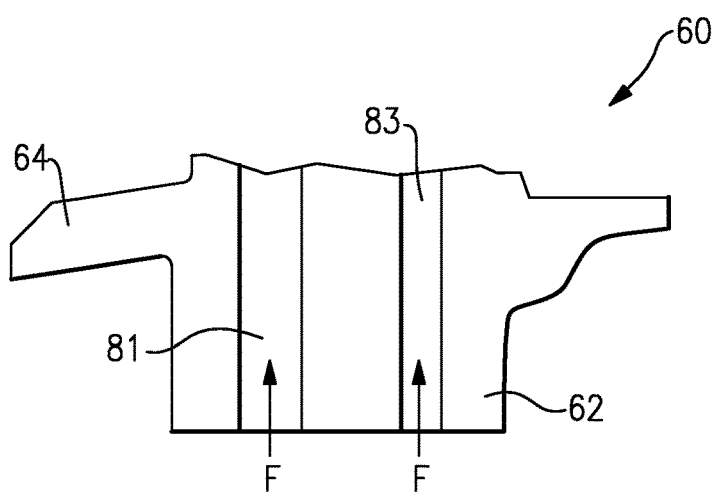
FIG. 3 is a schematic cross-sectional view of a root section of the blade of FIG. 2.

FIG. 3 is a schematic section view of the root section 62 of the rotor blade 60 of FIG. 2. The rotor blade 60 includes one or more internal cooling channels. In the example shown, there is at least a first cooling channel 81 near the leading edge 68, and a second cooling channel 83 positioned aft of the first cooling channel 81. The cooling channels 81, 83 direct cooling flow F radially outwardly toward the tip 76 of the blade 60. The cooling channels 81, 83 deliver cooling flow to the film cooling holes 78 and the cooling slots 79. The cooling channels internal to the airfoil section 66 can take various forms.

Figure 4:
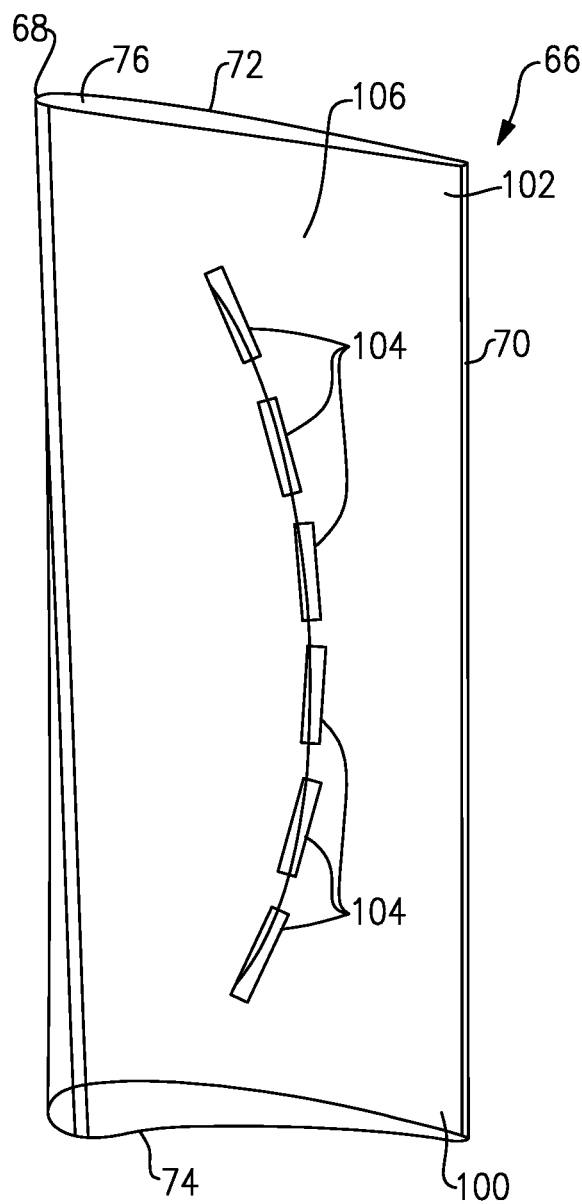
FIG. 4 is a schematic view of a core printout design for an airfoil.
Figure 5A:
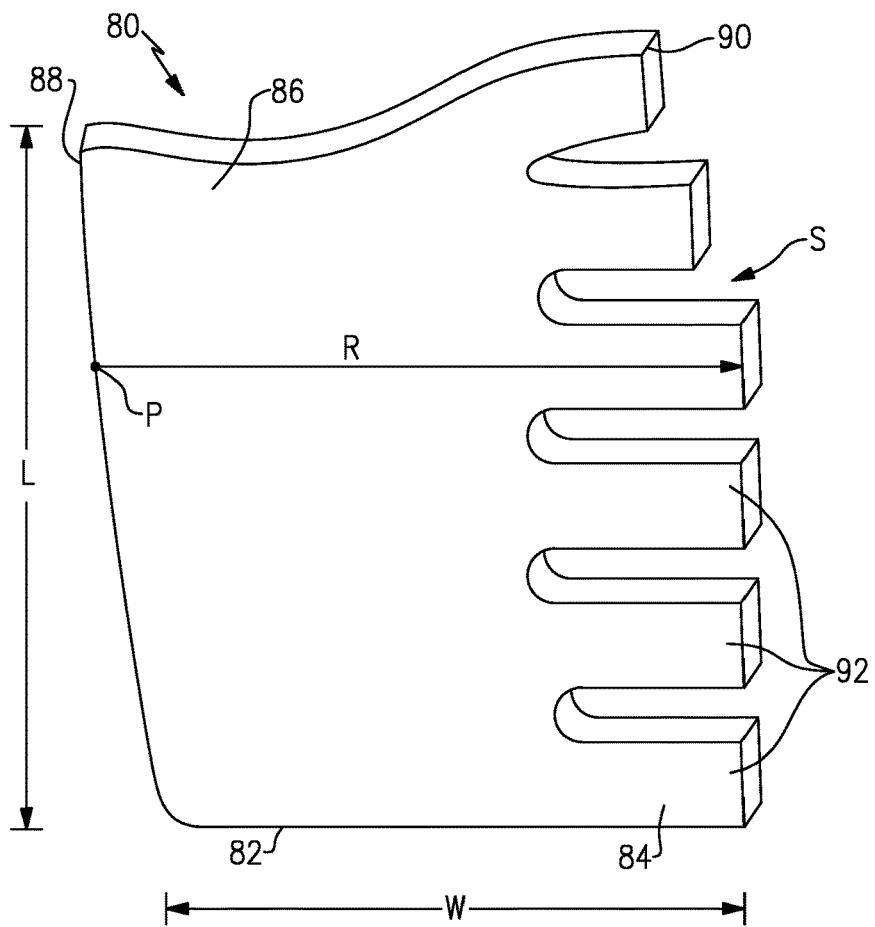
FIG. 5A is a schematic perspective view of a core with a staggered print out as shown in FIG. 4.
Figure 5B:
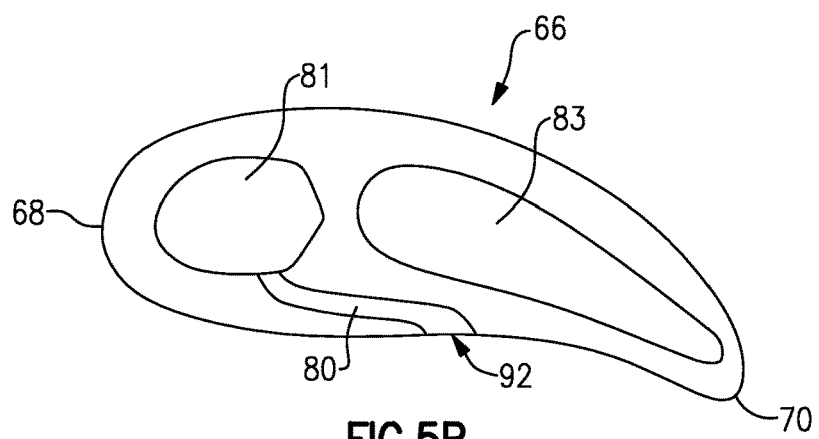
FIG. 5B shows the core as used in an airfoil section.

FIGS. 4 and 5A-5B show a structure 100 for providing a sacrificial core that is used in making gas turbine engine components such as airfoils for a blade or vane, a blade outer air seal (BOAS), or a combustor panel, for example. As known, the core is used to define a shaped opening within the finished component. For example, the core is used to define the internal cooling channels 81, 83 the airfoil section 66. Typically, the core is formed from a ceramic material or refractory metal; however, other suitable materials could also be used.

In order to improve cooling efficiency, the subject invention provides a core containing a feature that will leave a staggered core printout. This witness will follow streamline patterns such that the printouts are parallel or angled with the streamline, providing optimum film decay and aero mixing losses. This will result in an improvement in airfoil life.

As shown in FIGS. 5A-5B, a core 80 is used to form internal passages within a gas turbine engine component, such as an airfoil section 66. The shape of the core 80 is a positive structure that forms a corresponding negative shaped feature within the airfoil section 66. The core 80 comprises a body 82 that extends between a first end 84 and a second end 86 to define a length L, and extends between a first edge 88 and a second edge 90 to define a width W. A plurality of core extensions 92 is formed within as part of the body 82. The core extensions 92 are positioned to be staggered relative to each other such that adjacent core extensions 92 are variable relative to each other in a direction extending from the first end 84 to the second end 86 and or in a direction extending from the first edge 88 to a second edge 90.

In other words, at least two adjacent core extensions 92 are configured such that they are variable from each other in at least one dimension. For example, as shown in FIG. 5A, lengths of the core extensions 92 along the radial direction are different from each other. Longer core extensions are located near the center while shorter core extensions are located at the ends 84, 86. This is merely one example configuration, and other configurations could also be utilized.

The length L of the body 80 may or may not be greater than the width W. In one example, ends of the core extensions 92 are spaced apart from each other along a radius of curvature R. The spacing is defined by a point P that is located along one of the first 88 and second 90 edges. The core extensions 92 are positioned on the radius R. As such, the core extensions 92 are circumferentially spaced apart from each other long an arc segment S.

In one example, the body 82 is used to form an internal passage for an airfoil. In this example, the point P is positioned at the first edge 88 which corresponds to the leading edge 68 of the airfoil section 66. Further, as shown, the body 82 comprises a curvilinear structure extending between the edges 88, 90 to form a passage that includes both curved and/or or straight portions (FIG. 5B).

In one example, the core extensions 92 comprise rectangular-shaped core extensions that are defined by a first dimension extending along the arc segment and a second dimension extending transverse to the arc segment S. The first dimension, which corresponds generally to a length of the protrusion 92, is greater than the second dimension, which corresponds generally to a width of the protrusion. While rectangular shaped core extensions are shown as an example, it should be understood that other shapes could also be used such as polygonal, oval, or round shapes, for example.

The body 82 comprises a sacrificial component that defines an airfoil internal passage shape. As discussed above, the airfoil section 66 provides a body that extends from a radially inner end 100 to a radially outer end 102 to define a length, and extends between leading 68 and trailing 70 edges to define a width. The core extensions 92 contained within the core body 82 form a corresponding plurality of openings 104 within a wall surface 106 of the airfoil section 66. The openings 104 are open to the external surface and are staggered relative to each other as shown in FIG. 4. In one example, adjacent openings 104 are not aligned with each other in a direction extending from the radially inner end 100 to the radially outer end 102; however, other configurations could also be used.

As discussed above, the position of the openings 104 is determined by the location of the point P, which defines a radius of curvature R. The openings 104 are positioned along the arc segment S defined by the radius of curvature R and are circumferentially spaced apart from each other.

As known, streamline paths are defined in a direction generally extending from the leading edge 68 to the trailing edge 70 and possibly extending outward toward the suction side 72. The position and shapes of the openings 104 allows the cooling air flow exiting the openings 104 to be generally parallel or angled relative to an associated streamline path. This provides an optimized amount of film cooling.

In the example shown, the openings 104 are formed in the pressure side 74 of the airfoil section 66. Openings 104 could also be formed in the suction side 72 or openings 110 (FIG. 2) could be formed in the platform 64. Further, while the core body 82 is disclosed as forming an airfoil section 66 for a blade, the core body could also be used to form a vane, a blade outer air seal (BOAS), or a combustor panel for example. Additionally, instead of using cores, casting, EDM, laser, or additive manufacturing methods could be used to form the openings 104.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine component comprising:
    a body extending between first and second ends to define a length and extending between first and second edges to define a width;
    a plurality of openings formed within a wall surface of the body, wherein the plurality of openings are positioned to be staggered relative to each other such that at least two adjacent openings are offset from each other in at least one direction; and
    an arc segment formed along the length of the body, wherein the openings are spaced apart from each other along the arc segment.

2. The component according to claim 1 including a point along one of the first and second edges that defines a radius of curvature for the arc segment.

3. The component according to claim 2 wherein the body comprises an airfoil with the first edge comprising a leading edge, the second edge comprising a trailing edge, the first end comprising a radially inner portion and the second end comprising a tip portion, and wherein the point is located at a position that is nearer to the leading edge than the trailing edge.

4. The component according to claim 3 wherein flow exiting the openings is generally parallel or angled relative to an associated streamline path.

5. The component according to claim 4 wherein the body includes an internal cooling channel and a passage that leads from the internal cooling channel to an external surface of the body, and wherein the openings comprise polygonal or curved openings in the external surface.

6. The component according to claim 4 wherein the openings are formed in a pressure and/or suction side of the airfoil.

7. The component according to claim 4 wherein the openings are formed in a platform for a vane, blade, or blade outer air seal.

8. The component according to claim 1 wherein the openings are spaced apart from each other along the arc segment extending between the first and second ends.

9. The component according to claim 8 wherein the body includes an internal cooling channel and a passage that leads from the internal cooling channel to an external surface of the body, and wherein the openings comprise polygonal or curved openings in the external surface.

10. The component according to claim 1 wherein the body comprises one of an airfoil, a blade, a vane, a blade outer air seal, or a combustor panel.

11. The component according to claim 2 wherein the body comprises an airfoil with the first edge comprising a leading edge, the second edge comprising a trailing edge, the first end comprising a radially inner portion and the second end comprising a tip portion, and wherein the point is located at a position that is nearer to the trailing edge than the leading edge.

12. The component according to claim 2 wherein the body comprises an airfoil with the first edge comprising a leading edge, the second edge comprising a trailing edge, the first end comprising a radially inner portion and the second end comprising a tip portion, and wherein the point is located at a position that is nearer to a pressure side than a suction side.

13. The component according to claim 2 wherein the body comprises an airfoil with the first edge comprising a leading edge, the second edge comprising a trailing edge, the first end comprising a radially inner portion and the second end comprising a tip portion, and wherein the point is located at a position that is nearer to a suction side than a pressure side.

14. The component according to claim 2 wherein the body comprises an airfoil with the first edge comprising a leading edge, the second edge comprising a trailing edge, the first end comprising a radially inner portion and the second end comprising a tip portion, and wherein the point is located at a position that nearer to an engine centerline than the tip portion.

15. The component according to claim 1, wherein the arc segment curves between first and second arc ends, and wherein openings at each of the first and second arc ends are closer to one of the first and second edges than remaining openings that are located between the openings at each of the first and second arc ends.

16. The component according to claim 1, wherein the body comprises an airfoil with the first edge comprising a leading edge, the second edge comprising a trailing edge, the first end comprising a radially inner portion and the second end comprising a tip portion, and including a point along the leading edge that defines a radius of curvature for the arc segment such that openings at a center portion of the arc segment are nearer to the trailing edge than the openings at each opposing end of the arc segment.

* * * * *